United States Patent [19]

Langen

[11] Patent Number: 4,680,832
[45] Date of Patent: Jul. 21, 1987

[54] MEAT TENDERIZING NEEDLE

[75] Inventor: Jacobus J. Langen, Rexdale, Canada

[73] Assignee: H. J. Langen & Sons Limited, Mississauga, Canada

[21] Appl. No.: 915,378

[22] Filed: Oct. 6, 1986

[51] Int. Cl.⁴ .............................................. A22C 9/00
[52] U.S. Cl. ...................................... 17/25; 17/42.1; 99/532
[58] Field of Search ............................ 17/25, 26–31, 17/42.1; 99/532, 533

[56] References Cited

U.S. PATENT DOCUMENTS

| 210,503 | 12/1878 | Coulter | 17/30 |
| 4,257,144 | 3/1981 | Takegoshi et al. | 17/30 |
| 4,356,762 | 11/1982 | Langen | 99/533 |

FOREIGN PATENT DOCUMENTS 2645337 4/1977 Fed. Rep. of Germany .......... 17/25

Primary Examiner—Willie G. Abercrombie
Attorney, Agent, or Firm—Fetherstonhaugh & Co.

[57] ABSTRACT

A meat tenderizing needle is sharpened to provide first and second side faces which converge and meet at its distal end to form a pair of sharp tangs which are separated by a notch. The first and second side faces having first and second root edges extending along the perimeter of the passage formed in the distal end of the needle. The first root edge is sharp and forms a cutting edge toward which sinew in the meat which is being penetrated by the needles will be guided by the notch to be cut by the cutting edge rather than merely deflected out of the path of the needle.

4 Claims, 7 Drawing Figures

U.S. Patent  Jul. 21, 1987  4,680,832
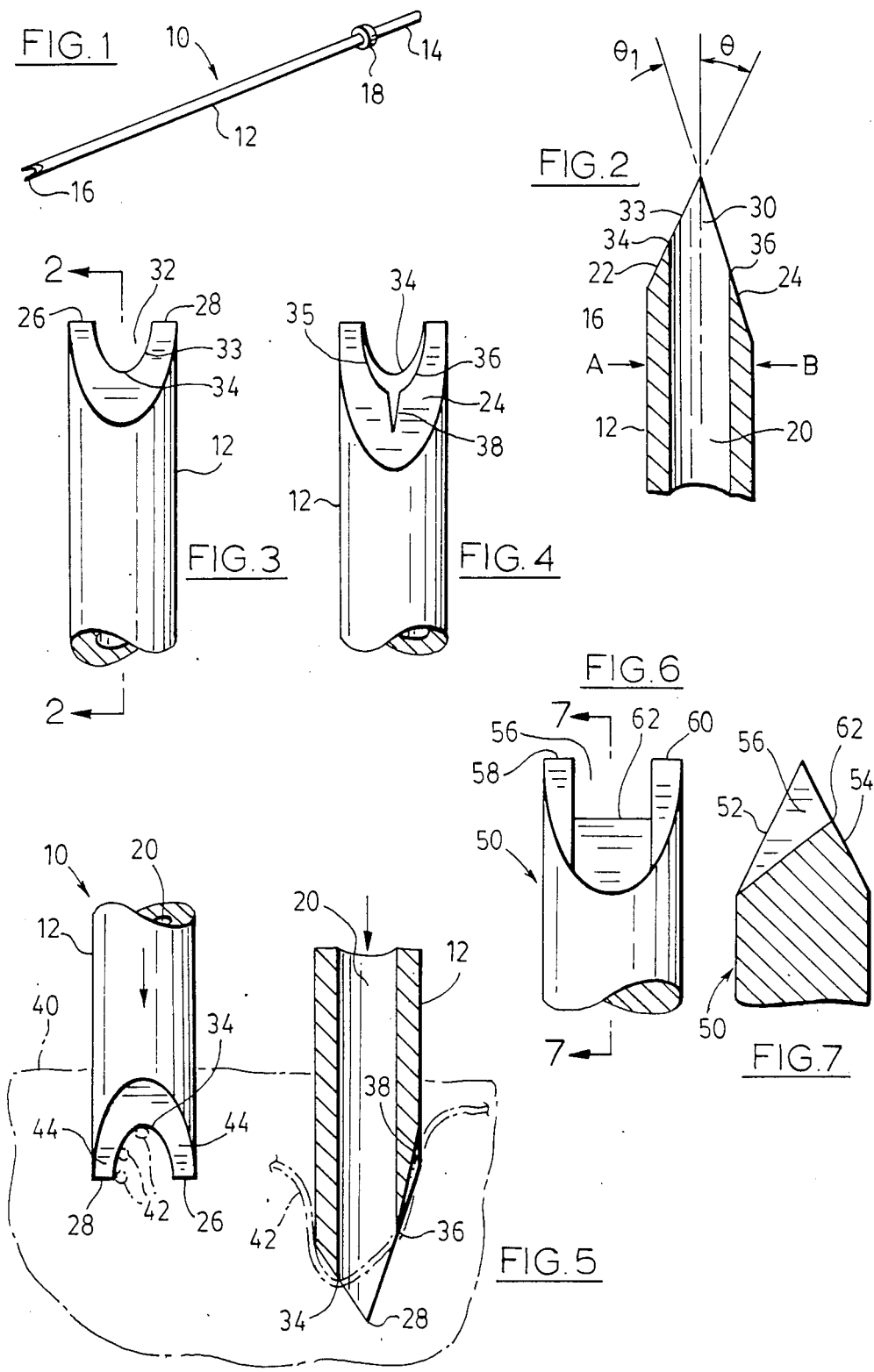

MEAT TENDERIZING NEEDLE

This invention relates to needles of the type used for tenderizing and injecting fluid into meat.

PRIOR ART

Needles have been used for many years for the purposes of puncturing meat in order to tenderize it. Meat becomes more tender when the muscle tissue is broken up by the insertion of the needles and it is common practice to repeatedly drive needles into a body of meat in order to tenderize the meat.

It is also well known to use tenderizing needles for the purpose of injecting fluid into meat. Needles for tenderizing and injecting brine into ham are well known and have been used for many years.

One of the most difficult problems in attempting to tenderize meat is that sinew which is present in meat is extremely tough and elastic with the result that when a conventional tenderizing needle comes in contact with sinew, the sinew is likely to be merely deflected to one side or other of the needle rather than being cut by the needle. As a result, while repeated penetration by tenderizing needles can have the effect of rendering the muscle tender, the needles have very little effect on sinew present in the meat with the result that meat which contains sinew, may not appear tender to the palate even when excessively tenderized by a needle injection process.

When hollow tubular needles are used for the purposes of injecting of fluid into meat, it is customary to sharpen the needles by forming a flat face which extends obliquely across the distal end of the needle. This provides a convex shaped cutting edge at the distal end of the needle and a concave cutting edge along the trailing edge of the through passage. The convex shaped distal end of the needle forms the leading end of the needle as it penetrates the body of meat. This leading edge will make the first contact with any sinew lying in the path of penetration. The convex curvature of this leading edge will tend to deflect the sinew to one side or the other of the needle and while this lateral movement may serve to draw the sinew along the cutting edge, the sinew is so tough and elastic that it is likely to be deflected laterally out of the path of penetration rather than being cut by the cutting edge.

The present invention overcomes the difficulties of the prior art by providing a meat tenderizing needle which has a fork-shaped distal end which is provided with a cutting edge in the root formed between the tangs of the fork. The tangs of the fork are effective in guiding sinew toward the cutting edge rather than deflecting sinew away from the cutting edge.

When the tenderizing needle has a through passage for fluid injection, two root edges will be provided in each notch and in order to concentrate the cutting load at one of these root edges, I prefer to sharpen the needle such that one of the angled faces is inclined at a different angle from the other so that the first of the root edges will form a leading edge.

According to one aspect of the present invention, there is provided a meat tenderizing needle comprising an elongated body and a proximal end, the distal end, said distal end of said body being sharpened to provide a pair of tangs which are separated by a notch, said notch having a sharp root edge forming a cutting edge toward which sinew in the meat which is being penetrated by the needles will be guided by the notch to be cut by the cutting edge rather than merely deflected out of the path of the needle.

According to a further aspect of the present invention, there is provided a needle for tenderizing an injecting fluid into meat comprising a tubular body having a proximal end and a distal end and a through passage extending longitudinally therebetween, said distal end being sharp and having two sharp tangs arranged in the form of a fork and separated from one another by a notch which has a first root edge at one side of said through passage which is sharper, in use said distal end of said needle being driven into a body of a meat and said tangs serving to retain meat sinew therebetween and directed toward said first root edge to be cut thereby.

The invention will be more clearly understood after reference to the following detailed specification read in conjunction with the drawings wherein;

FIG. 1 is a pictorial side view of a tenderizing needle constructed in accordance with an embodiment of the present invention, FIG. 2 is a sectional side view taken along the line 2—2 of FIG. 3, FIG. 3 is a side view of the distal end of a needle taken in the direction of the arrow A of FIG. 2, FIG. 4 is a side view of the distal end of a tenderizing needle taken in the direction of the arrow B of FIG. 2, FIG. 5 is a partially sectioned view showing the manner in which the needles penetrate a body of meat and serve to cut sinew, FIG. 6 is a front view of the distal end of a needle according to a further embodiment of the present invention, FIG. 7 is a sectional side view taken along the lines 7—7 of FIG. 6.

With reference to FIG. 1 of the drawings, the reference numeral 10 refers generally to a tenderizing and injection needle constructed in accordance with an embodiment of the present invention. The needle 10 has a tubular body 12 which has a proximal end 14 and a distal end 16. A mounting flange 18 is located at the proximal end for use in mounting the needle into the head of a tenderizing and injection device.

As shown in FIG. 2 of the drawings, a passage 20 opens through the distal end 16.

The distal end 16 is sharpened to provide a first flat side face 22 and a second flat side face 24 which converge and meet a pair of primary cutting edges 26 and 28 which extend radially and are located on the central longitudinal plane 30. A concave notch 32 is formed between the orimary cutting edges 26 and 28. The first flat side face 22 intersects the through passage 20 along an arcuate shaped edge 33 which has a sharp root portion 34. The second flat side face 24 intersects the through passage 20 along an arcuate shaped edge 35 which has a root portion 36. It will be noted that the angle of inclination $\theta$ of the first flat side face 22 is greater than the angle of inclination $\theta_1$, of the second side face 24 with the result that the root portion 34 is located more closely adjacent the distal end of the needle than is the root portion 36. It follows that the root portion 34 will form the second cutting edge which engages the meat upon penetration of a body of meat by the needles in use. As shown in FIGS. 4 and 5 of the drawings, the second flat side face 24 also has a shallow elongated channel 38 extending longitudinally from the root 36. This channel serves to further center sinews on the secondary cutting edge.

As shown in FIG. 5 of the drawings, when a needle is driven into a body of meat 40 and encounters sinews 42, any sinew 42 which is positioned between the tangs 44 will be guided along the edge of the notch 32 toward the secondary cutting edge formed at the root 34. As also shown in FIG. 5 of the drawings, the fact that the second root edge 36 is spaced from the first root edge 34, serves to concentrate the cutting load applied to the sinews along the first root edge 34. The sinews 42 will also be directed into the channel 38 so as to further align the sinews 42 with the first root edge 34. From the foregoing it will be apparent that the needle of the present invention serves to prevent lateral displacement of sinew away from the cutting edge in circumstances where the sinew is located inwardly of the tangs 44. The notches serve to guide the sinews along a sharp cutting edge to a position in which they will be retained in the root formed between the tangs 44 so as to be cut by the root cutting edge 34.

The root portions 34 and 36 are longitudinally spaced from one another to encourage the cutting of the sinews at one point along their length rather than at two points. While this is a desirable feature in that it increases the likelihood of successfully cutting the sinews, it is possible to take advantage of the trapping characteristics of the fork-shaped needle by forming the flat side faces at the same angle with respect to the central plane. That it is to say, both side faces 22 and 24 may be inclined at an angle O with respect to the central longitudinal plane 30. Other modifications of the needle described in the preferred embodiment will be apparent to those skilled in the art.

By reason of the fact that there are four spaced apart cutting edges formed on the needle of the present invention, the needle will tend to form a rough cut in the body of the meat into which it is driven. This has the advantage that when the needle is withdrawn, the irregularities formed by the cut will serve to inhibit the removal of the fluid which has been injected through the needle in the fluid injection process.

Various modifications of the present invention will be apparent to those skilled in the art. One such modification is illustrated in FIGS. 6 and 7 of the drawings. In this embodiment, the needle is a solid tenderizing needle which does not include a through passage.

With reference to FIGS. 6 and 7, the reference numeral 50 refers generally to the distal end of a tenderizing needle. The distal end 50 is sharpened to provide first and second flat side faces 52 and 54. A notch 56 is formed between a pair of tangs 58 and 60. A sharp cutting edge 62 is formed at the edge where the root intercepts the second side face 54. This sharp cutting edge 62 performs the same function as the edge 35 of the first described embodiment. Again the sinew will be guided toward the cutting edge 62 as the needle is driven into a body of meat.

I claim:

1. A meat tenderizing needle comprising an elongated body which is circular in cross-section, said body having a distal end and a proximal end, said distal end of said body being sharpened to provide first and second side faces which converge and meet at a first cutting edge, and a third side face which is located centrally of the width of the first side face and which is inclined so as to intersect the second side face at a point spaced from the first cutting edge to form a pair of tangs which are separated by a notch, said notch having a root edge forming a cutting edge toward which sinew in the meat which is being penetrated by the needle will be guided by the notch to be cut by the cutting edge rather than merely deflected out of the path of the needle.

2. A needle for tenderizing and injecting fluid into meat comprising a tubular body having a proximal end and a distal end and a through passage extending longitudinally therebetween, said distal end being sharp and having two sharp tangs arranged in the form of a fork and separated from one another by a notch which has a first root edge at one side of said through passage which is sharpened, in use said distal end of said needle being driven into a body of a meat and said tangs serving to retain meat sinew therebetween and serving to direct the sinews toward said first root edge to be cut thereby.

3. A needle as claimed in claim 2, wherein said notch has a second root edge on the opposite side of said through passage which is spaced a greater distance from the distal end than is the first root edge such that the first root edge will penetrate the meat in advance of the second root edge and substantially the full cutting load applied to the sinews by the needle will be applied along the first root edge.

4. A needle as claimed in claim 3, wherein a narrow centering channel extends from the second root edge toward the proximal end of the needle, said channel serving to further retain sinew against lateral movement to thereby increase the cutting effectiveness of said first root edge.

* * * * *